US011970996B2

(12) United States Patent
Bulk et al.

(10) Patent No.: US 11,970,996 B2
(45) Date of Patent: Apr. 30, 2024

(54) STAGED COMBUSTION LIQUID ROCKET ENGINE CYCLE WITH THE TURBOPUMP UNIT AND PREBURNER INTEGRATED INTO THE STRUCTURE OF THE COMBUSTION CHAMBER

(71) Applicant: Special Aerospace Services, LLC, Boulder, CO (US)

(72) Inventors: Timothy Bulk, Boulder, CO (US); Christopher Hayes, Boulder, CO (US)

(73) Assignee: Special Aerospace Services, LLC, Boulder, CO (US)

( * ) Notice: Subject to any disclaimer, the term of this patent is extended or adjusted under 35 U.S.C. 154(b) by 0 days.

(21) Appl. No.: 18/211,277

(22) Filed: Jun. 18, 2023

(65) Prior Publication Data
US 2023/0332562 A1    Oct. 19, 2023

Related U.S. Application Data

(63) Continuation-in-part of application No. 17/503,526, filed on Oct. 18, 2021, now Pat. No. 11,708,804, (Continued)

(51) Int. Cl.
*F02K 9/48*    (2006.01)
*F02K 9/52*    (2006.01)
(Continued)

(52) U.S. Cl.
CPC .................. *F02K 9/48* (2013.01); *F02K 9/52* (2013.01); *F02K 9/64* (2013.01); *F02K 9/82* (2013.01);
(Continued)

(58) Field of Classification Search
CPC ... F02K 9/44; F02K 9/48; F02K 9/563; F02K 9/64; F02K 9/82; F02K 9/86; F02K 9/972
See application file for complete search history.

(56) References Cited

U.S. PATENT DOCUMENTS 2,408,111 A * 9/1946 Truax .................. F02K 9/64
60/260
3,577,735 A * 5/1971 Schmidt ............... F02K 9/48
60/761
(Continued)

FOREIGN PATENT DOCUMENTS

GB    2190964    12/1987

OTHER PUBLICATIONS

International Searching Authority, International Search Report and Written Opinion dated Jun. 11, 2021 in PCT/US2020/49588.
(Continued)

*Primary Examiner* — Kyle Robert Thomas
(74) *Attorney, Agent, or Firm* — Critical Path IP Law, LLC

(57) ABSTRACT

Devices and methods of rocket propulsion are disclosed. In one aspect, a staged combustion liquid rocket engine with preburner and turbopump unit (TPU) integrated into the structure of the combustion chamber is described. An initial propellant mixture is combusted in a preburner combustion chamber formed as an annulus around a main combustion chamber, the combustion products from the preburner driving the turbine of the TPU and subsequently injected into the main combustion chamber for secondary combustion along with additional propellants, generating thrust through a supersonic nozzle. The preburner inner cylindrical wall is shared with the outer cylindrical wall of the engine's main combustion chamber and the turbine is axially aligned with the main combustion chamber. Liquid propellants supplied to the engine are utilized for regenerative cooling of the combustion chamber and preburner, where the liquid propellants are gasified in cooling manifolds before injection into the preburner and main combustion chamber.

20 Claims, 3 Drawing Sheets

Related U.S. Application Data which is a continuation of application No. 17/013,457, filed on Sep. 4, 2020, now Pat. No. 11,149,691.

(60) Provisional application No. 62/897,044, filed on Sep. 6, 2019, provisional application No. 62/724,580, filed on Aug. 29, 2018.

(51) Int. Cl.
    *F02K 9/64*     (2006.01)
    *F02K 9/82*     (2006.01)
    *F02K 9/50*     (2006.01)
    *F02K 9/97*     (2006.01)

(52) U.S. Cl.
    CPC ............ *F02K 9/50* (2013.01); *F02K 9/972* (2013.01); *F05D 2220/80* (2013.01); *F05D 2260/205* (2013.01); *F05D 2260/601* (2013.01)

(56) References Cited

U.S. PATENT DOCUMENTS

| | | | | |
|---|---|---|---|---|
| 3,597,923 A | * | 8/1971 | Simon | F02K 9/44 |
| | | | | 60/260 |
| 3,636,712 A | * | 1/1972 | Kaufmann | F02K 9/64 |
| | | | | 60/260 |
| 6,226,980 B1 | | 5/2001 | Katorgin | |
| 2010/0024386 A1 | | 2/2010 | Greene | |

OTHER PUBLICATIONS

USPTO Notice of Allowance in U.S. Appl. No. 17/013,457 dated May 28, 2021.
USPTO non-final Office Action in U.S. Appl. No. 17/503,526 dated Dec. 6, 2022.
USPTO Notice of Allowance in U.S. Appl. No. 17/503,526 dated Mar. 29, 2023.

* cited by examiner

STAGED COMBUSTION LIQUID ROCKET ENGINE CYCLE WITH THE TURBOPUMP UNIT AND PREBURNER INTEGRATED INTO THE STRUCTURE OF THE COMBUSTION CHAMBER

CROSS-REFERENCE TO RELATED APPLICATIONS

This application is a continuation in part of U.S. patent application Ser. No. 17/503,526 filed Oct. 18, 2021 and titled "Staged Combustion Liquid Rocket Engine Cycle with the Turbopump Unit and Preburner Integrated into the Structure of the Combustion Chamber," which in turn claims the benefit of U.S. patent application Ser. No. 17/013,457 filed Sep. 4, 2020 and titled "Staged Combustion Liquid Rocket Engine Cycle with the Turbopump Unit and Preburner Integrated into the Structure of the Combustion Chamber," which in turn claims the benefit of priority to U.S. Provisional Patent Application Nos. 62/897,044, filed Sep. 6, 2019 and titled "Method of Operation of Methane LRE with the TPU Drive Gas Generator Integrated into the Structure of the Combustion Chamber," and 62/724,580, filed Aug. 29, 2018 and titled "A Method of Operation of Methane LRE with the TPU Drive Gas Generator Integrated into the Structure of the Combustion Chamber," the disclosures of which are hereby incorporated herein by reference in entirety.

FIELD

The disclosure relates generally to devices and methods of rocket propulsion, and more specifically to a staged combustion bipropellant Liquid Rocket Engine (LRE) with the Turbo Pump Unit (TPU) and preburner integrated into the structure of the main combustion chamber.

BACKGROUND

Liquid Rocket Engines (LRE) are primarily used in the aerospace industry to power launch vehicles into space. Development of new LREs seek to improve efficiency in any of several ways. The disclosure improves the overall LRE efficiency through combining components in a manner that reduces the overall weight of the LRE and simplifies the method of operation of the high efficiency staged combustion cycle.

In one embodiment, a unique and non-obvious combination and interaction between an LRE main combustion chamber, LRE preburner, and LRE Turbo Pump Unit (TPU) is disclosed. Generally, the disclosure addresses, among other things, the task of ensuring the operability, compactness, dry mass reduction and efficiency of the LRE by combusting an initial propellant mixture in a preburner chamber which forms an annulus around the main combustion chamber of the engine as a single structural unit, where the preburner inner cylindrical wall is shared with the outer cylindrical wall of the engine's main combustion chamber. After combustion in the annular preburner chamber, the combusted initial propellant mixture drives the turbine of the TPU and is subsequently injected into the main combustion chamber for secondary combustion along with additional propellants. At the same time, the LRE is configured with an elegantly simple design based on modern science and manufacturing technology development; the result is a highly integrated engine that requires relatively minimal funds and time to produce as a serial model using additive manufacturing techniques. Furthermore, the engine is reliable, restartable, and provides optimal mass characteristics while implementing preset technical parameters in specific design embodiments.

SUMMARY

The present disclosure can provide a number of advantages depending on the particular aspect, embodiment, and/or configuration.

Devices and methods of rocket propulsion are disclosed. In one aspect, a methane Liquid Rocket Engine (LRE) with the TPU drive gas generator integrated into the structure of the combustion chamber is described.

In one embodiment, a liquid rocket engine (LRE) is disclosed, the LRE comprising: a fuel supply line containing a fuel; an oxidizer supply line containing an oxidizer; an oxidizer throttle receiving the oxidizer from the oxidizer supply line and splitting the oxidizer supply line into a first partial oxidizer supply line, a second partial oxidizer supply line, and a third partial oxidizer supply line; a turbine mounted to a turbine shaft along a longitudinal centerline of the LRE at a longitudinal proximal location of the LRE, the turbine rotating with the turbine shaft about the longitudinal centerline; a gas duct positioned longitudinally distal to the turbine and in fluid communication with the turbine; a main combustion chamber positioned longitudinally distal to the gas duct, having an injector head in fluid communication with both the gas duct and the second partial oxidizer supply line; a nozzle positioned longitudinally distal to the main combustion chamber and in fluid communication with the main combustion chamber; a preburner combustion chamber positioned axially distal to the main combustion chamber, having a preburner injector head in fluid communication with both the first cooling manifold and second cooling manifold; a first cooling manifold positioned axially distal to the nozzle and in fluid communication with the fuel supply line; a second cooling manifold positioned axially between the preburner combustion chamber and the main combustion chamber, the second cooling manifold in fluid communication with the first partial oxidizer supply line; and a third cooling manifold positioned longitudinally distal to the preburner combustion chamber and in fluid communication with the third partial oxidizer supply line and a nozzle throat of the nozzle; wherein: the fuel received by the first cooling manifold from the fuel supply line becomes a gasified fuel during transport due to thermal energy transfer from the nozzle, the gasified fuel is supplied to the preburner injector head; the oxidizer received by the second cooling manifold from the first partial oxidizer supply line becomes a gasified oxidizer due to thermal energy received from at least one of the gas duct, the main combustion chamber, and the preburner combustion chamber, the gasified oxidizer supplied to the preburner injector head; the preburner injector head injects the gasified fuel with the gasified oxidizer to create preburner combustion exhaust products which flow from the preburner combustion chamber to the turbine and drive the turbine about the turbine shaft, the preburner combustion exhaust products flowing from the turbine to the gas duct; and the main combustion chamber injector head injects the preburner combustion exhaust products received from the gas duct with oxidizer received from the second partial oxidizer supply line to produce an LRE thrust directed through the nozzle exit.

In one aspect, the fuel is methane. In another aspect, the main combustion chamber comprises a main chamber ignitor head which ignites the preburner combustion exhaust products with the oxidizer. In another aspect, the turbine is a centrifugal turbine. In another aspect, the preburner combustion chamber comprises a set of flow vanes, the set of flow vanes directing the preburner combustion exhaust products to a set of blades of the turbine. In another aspect, the gasified fuel supplied to the preburner injector head is completely gasified. In another aspect, the LRE forms a closed propellant supply scheme LRE. In another aspect, the preburner combustion chamber and the second cooling manifold at least partially share a common surface side wall. In another aspect, the third manifold is positioned at a throat of the nozzle. In another aspect, the fuel of the fuel supply line is provided by a fuel pump, the fuel pump driven by the turbine shaft. In another aspect, the oxidizer of the oxidizer supply line is provided by an oxidizer pump, the oxidizer pump driven by the turbine shaft. In another aspect, the preburner combustion chamber forms an annulus around the main combustion chamber. In another aspect, cooling manifold three is configured to provide at least one of a film and a transpiration cooling of the throat of the nozzle.

In another embodiment, a method of operating a liquid rocket engine (LRE) is disclosed, the method comprising: providing a LRE comprising: a fuel supply line containing a fuel; an oxidizer supply line containing an oxidizer; an oxidizer bypass regulator receiving the oxidizer from the oxidizer supply line and splitting the oxidizer supply line into a first partial oxidizer supply line, a second partial oxidizer supply line, and a third partial oxidizer supply line; a turbine mounted to a turbine shaft along a longitudinal centerline of the LRE at an LRE longitudinal proximal location, the turbine rotating with the turbine shaft; a gas duct positioned longitudinally distal to the turbine and in fluid communication with the turbine; a main combustion chamber positioned longitudinally distal to the gas duct and in fluid communication with the gas duct, the main combustion chamber having an injector head in fluid communication with the second partial oxidizer supply line; a nozzle positioned longitudinally distal to the main combustion chamber and in fluid communication with the main combustion chamber; a preburner combustion chamber positioned axially distal to the main combustion chamber; a first cooling manifold positioned axially distal to the nozzle and in fluid communication with the fuel supply line; a second cooling manifold positioned axially between the preburner combustion chamber and the main combustion chamber, the second cooling manifold in fluid communication with the first partial oxidizer supply line and the preburner combustion chamber; and a third cooling manifold positioned longitudinally distal to the preburner combustion chamber and in fluid communication with the third partial oxidizer supply line and the preburner combustion chamber; gasifying the fuel received in the first cooling manifold by way of heat transfer from the nozzle to the first cooling manifold to produce gasified fuel; gasifying the oxidizer received by the second cooling manifold by way of heat transfer from the gas chamber and the main combustion chamber to the second cooling manifold to produce gasified oxidizer; igniting the gasified fuel with the gasified oxidizer at the preburner ignitor head to produce preburner combustion chamber exhaust products; passing the preburner combustion chamber products to the main combustion chamber by way of the gas duct; and igniting the preburner combustion chamber products with the oxidizer supplied by the second partial oxidizer supply fuel line to produce an LRE thrust directed through the nozzle.

In one aspect, the fuel is methane. In another aspect, the fuel of the fuel supply line is provided by a fuel pump, the fuel pump driven by the turbine shaft; and the oxidizer of the oxidizer supply line is provided by an oxidizer pump, the oxidizer pump driven by the turbine shaft. In another aspect, the preburner combustion chamber forms an annulus around the main combustion chamber. In another aspect, the turbine is a centrifugal turbine. In another aspect, the preburner combustion chamber and the second cooling manifold at least partially share a common surface side wall. In another aspect, the gasified fuel supplied to the preburner injector head is completely gasified; the cooling manifold three is configured to provide at least one of a film and a transpiration cooling of a throat of the nozzle; and the LRE forms a closed propellant supply scheme LRE.

In another aspect, the preburner injector head injects the gasified fuel with the gasified oxidizer into the preburner combustion chamber so as to thoroughly mix the fuel and oxidizer together and to disperse them in the combustion chamber where they are ignited and combusted to create preburner combustion exhaust products which flow from the preburner combustion chamber to the turbine and drive the turbine about the turbine shaft, the preburner combustion exhaust products flowing from the turbine to the gas duct.

In yet another aspect, the main combustion chamber injector head injects the preburner combustion exhaust products received from the gas duct with oxidizer received from the second partial oxidizer supply line in to the main combustion chamber so as to thoroughly mix the fuel and oxidizer together and to disperse them in the combustion chamber where they are ignited and combusted to produce a fluid flow which is choked and expanded at supersonic velocity through the nozzle, generating thrust directed through the nozzle exit.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that can perform the functionality associated with that element.

The phrase "graphical user interface" or "GUI" means a computer-based display that allows interaction with a user with aid of images or graphics.

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

Figure 1:
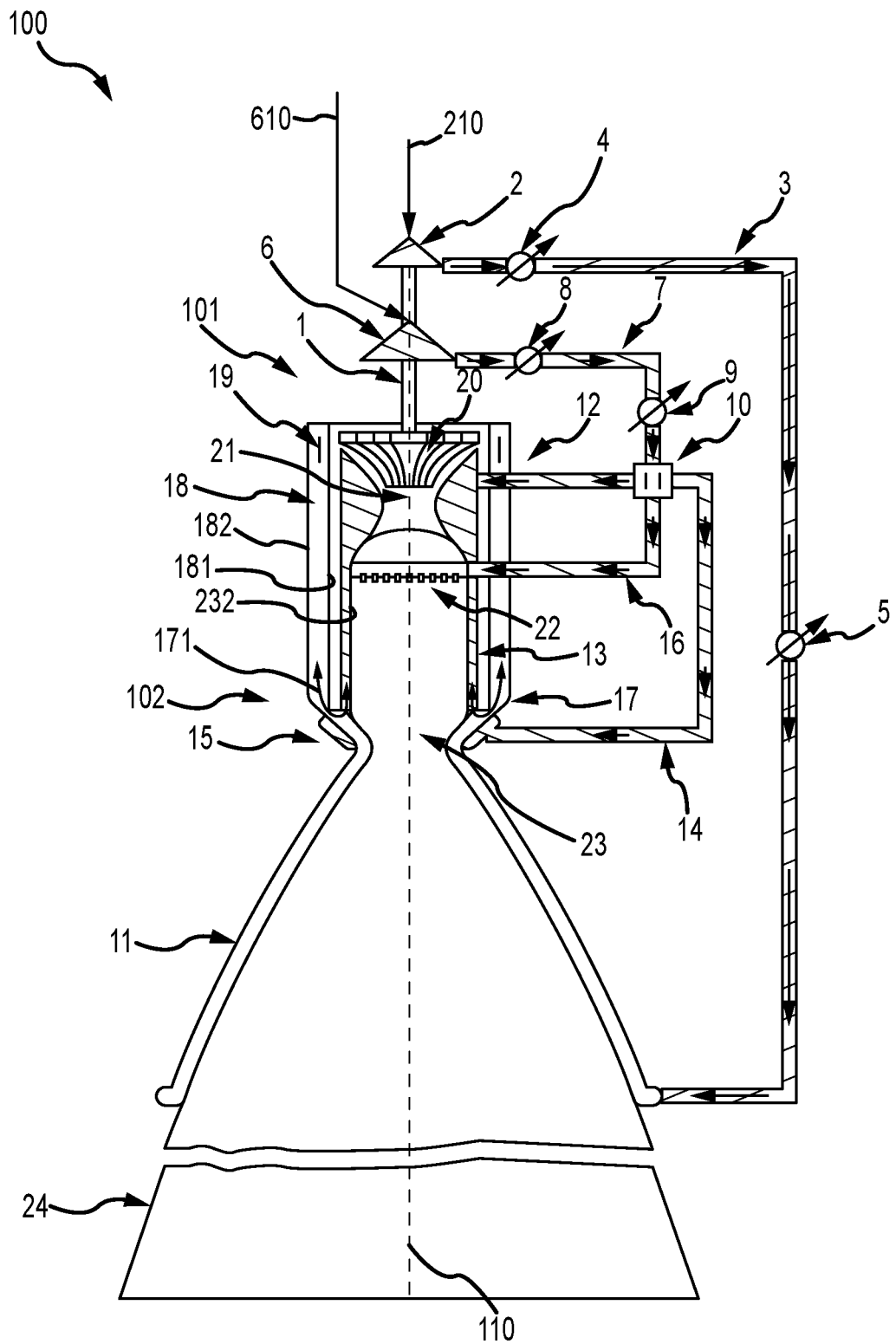
FIG. 1 shows a schematic diagram of one embodiment of a methane/oxygen LRE system with the preburner and TPU integrated into the structure of the combustion chamber.
Figure 2:
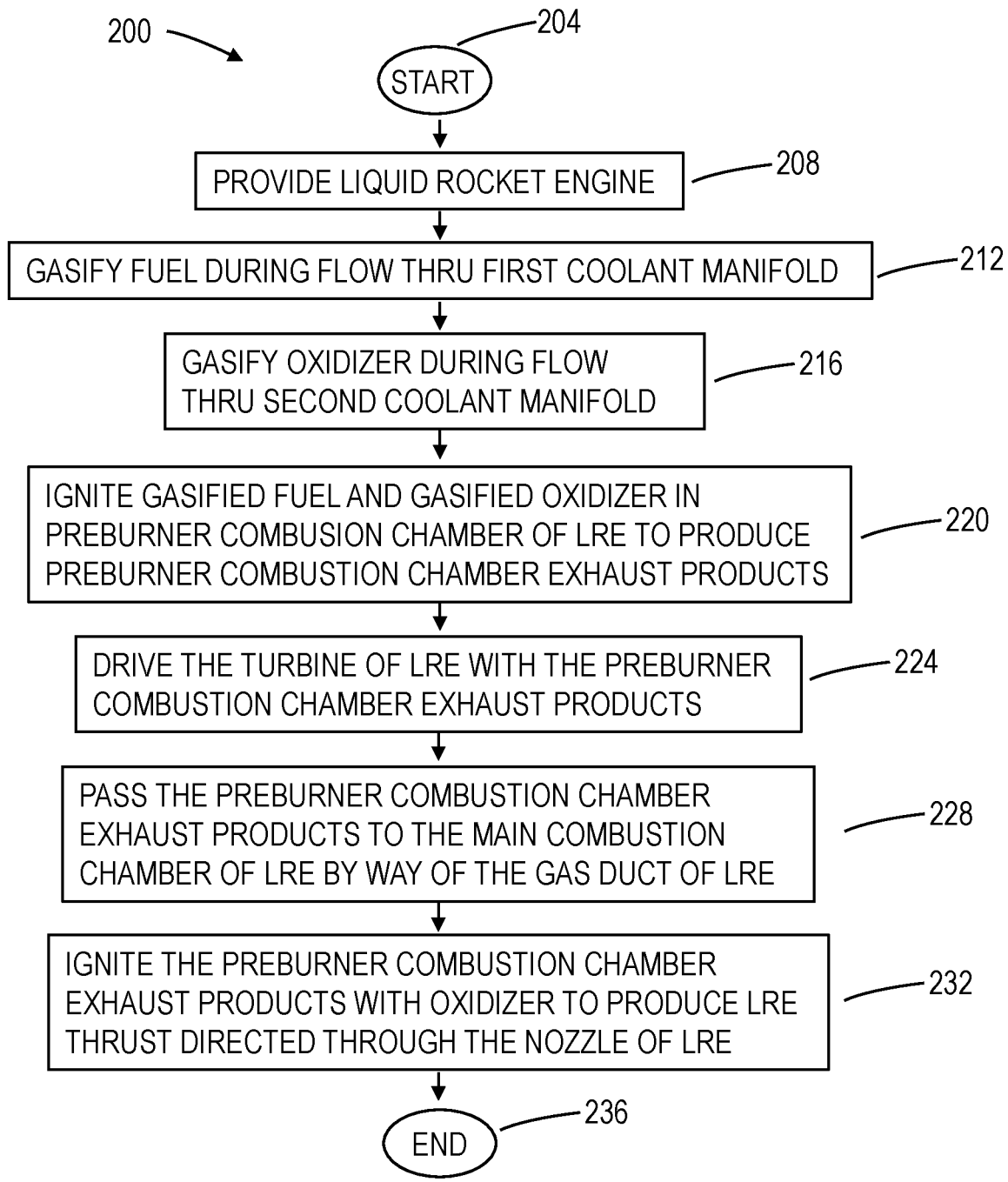
FIG. 2 shows a flowchart of one method of operation of the methane/oxygen LRE system of FIG. 1.
Figure 3:
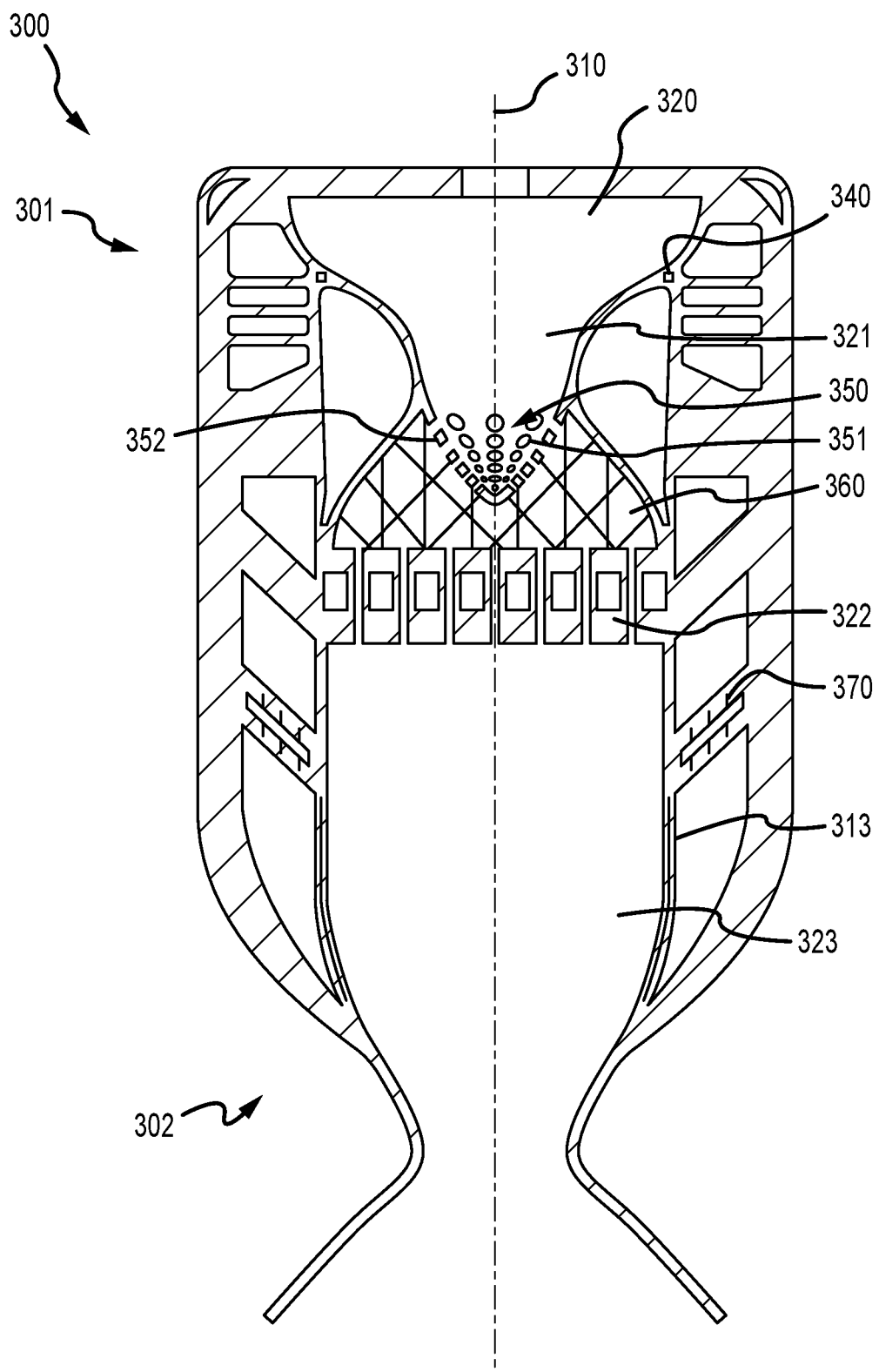
FIG. 3 shows a schematic diagram of one embodiment of a methane/oxygen LRE system with a flow collimator.

FIG. 1 is a schematic diagram of one embodiment of a methane/oxygen LRE system with the preburner and TPU integrated into the structure of the combustion chamber (also referred to as "methane/oxygen LRE system," "LRE system," and/or simply "LRE"). FIG. 2 is a flowchart of one method of operation of the methane/oxygen LRE system (also referred to as "LRE system method" or "LRE method") of FIG. 1. FIG. 3 is a schematic diagram of another embodiment of a methane/oxygen LRE system with a flow collimator.

Generally, an LRE is disclosed in which combustion of an initial propellant mixture is performed in a preburner chamber, the preburner chamber forming an annulus around a main combustion chamber of the engine as a single structural unit. The preburner inner cylindrical wall is shared with the outer cylindrical wall of the engine's main combustion chamber and contains a part of cooling manifold two, providing cooling to both the preburner combustion chamber and main combustion chamber. After combustion in the annular preburner chamber, the combusted initial propellant mixture drives the turbine of a turbo pump unit (TPU) and is subsequently injected into the main combustion chamber for secondary combustion along with additional propellants.

In other aspects of the disclosed LRE, the amount of liquid fuel supplied to the engine is fully utilized for regenerative cooling of the nozzle part of combustion chamber, where the liquid fuel is completely gasified and enters the cavities of a preburner where it is partially burnt in the preburner combustion chamber. The liquid oxidizer is supplied partly to the combustion chamber directly, and partly, with partial gasification, to the fuel-rich gas generator, where the gasified fuel that was supplied is burnt together with the oxidizer. The resulting fuel-rich gas is principally used to power a centrifugal turbine; afterwards the fuel-rich gas is burnt again in the combustion chamber of the engine with additional oxidizer generating thrust through a supersonic nozzle. This described LRE is a closed propellant supply scheme engine.

With attention to FIG. 1, the Liquid Rocket Engine (LRE) 100 comprises an upper or proximal LRE portion 101 and a lower or distal portion 102. A longitudinal axis 110 passes through and extends pass the proximal LRE portion 101 and the distal portion 102. For example, the longitudinal axis 110 extends from distal LRE portion 102 through nozzle 110, as depicted in FIG. 1.

A series or sequence of components of the LRE 100 are assembled in a linear fashion along the longitudinal axis 110. Moving from the uppermost or most proximal location downwards or distally along the longitudinal axis 110, a sequence of the following components are positioned: fuel pump 2, oxidizer pump 6, turbine 20, gas duct 21, main combustion chamber 23, and nozzle 24. Also, positioned axially surrounding the gas duct 21 and at least substantially most of both of the turbine 20 and main combustion chamber 23, are each of the preburner combustion chamber 18 and the cooling manifold two 13. A TPU shaft 1 runs along the longitudinal axis 110, the TPU shaft 1 positioned at an axial centerline of the fuel pump 2, oxidizer pump 6, turbine 20, gas duct 21, main combustion chamber 23, nozzle 24, preburner combustion chamber 18 and the cooling manifold two 13.

Fuel pump 2 receives fuel from a fuel tank (not shown) by way of fuel feed line 210 and is driven by turbine 20 by way of TPU shaft 1. The fuel pump 2 supplies fuel to fuel supply line 3 (note: $\Delta P_{FL}$). The fuel pump may be referred to as FP. The fuel pump 2 provides fuel to the LRE. The fuel supply line 3 runs to, or is in fluid communication with, a fuel bypass regulator valve 4 (note FBR and $\Delta P_{r-f}$), which can reroute fuel upstream of the fuel pump 2. The fuel supply line 3 also runs to, or is in fluid communication with, a line regulator value (note FLR). The fuel supply line 3 runs to, or connects with, cooling manifold one 11 so as to supply fuel to the cooling manifold one 11. As fuel provided by fuel supply line 3 flows through cooling manifold one 11 the fuel becomes gasified wherein the gasified fuel is received at preburner injector head 17.

The term "fluid" means a substance devoid of shape and yields to external pressure, to include liquids and gases, e.g. fuels or oxidizers in liquid or gaseous form). The phrase "fluid communication" means a fluid flows or runs between or within two or more locations, elements, or components.

Oxidizer pump 6 receives oxidizer from an oxidizer tank (not shown) by way of oxidizer feed line 610 and is driven by turbine 20 by way of TPU shaft 1. The oxidizer pump 6 supplies oxidizer to main oxidizer supply line 7 (note $\Delta P_{OL}$). The oxidizer pump 6 may be referred to as OP. The oxidizer pump 6 provides oxidizer to the LRE at three positions. An oxidizer bypass regulator valve 8 (note OBR and $\Delta P_{r-o}$) reroutes fuel upstream of the oxidizer pump 6. (Note that "downstream" refers to a position relatively forward in a fluid flow, meaning a position in the direction of the fluid flow, and "upstream" refers to a position relatively behind in a fluid flow, meaning a position in the opposite direction of the fluid flow.) After, or downstream, of the oxidizer regular value 8, the oxidizer supply line 7 continues to the oxidizer line regulator valve 9 (note OLR), then continues to the oxidizer throttle 10.

In one embodiment, the oxidizer pump 6 and/or fuel pump 2 form component loop system for engine control.

The oxidizer throttle 10 splits the oxidizer supply line 7 into three partial oxidizer supply lines: a first partial oxidizer supply line 12, a second partial oxidizer supply line 16, and a third partial oxidizer supply line 14.

The first partial oxidizer supply line 12 supplies oxidizer to cooling manifold two 13 (note $\Delta P_{OL_{gg}}$) with gasification coefficient $\beta_o<1.0$. Note that $\beta$ is the fractional amount of a fluid which is in a gaseous state ($1-\beta$ is the amount in a liquid state). The subscripts o and f indicate oxidizer (usually oxygen) and fuel (usually methane or another hydrocarbon).

With respect to the cooling manifold two 13, a gasification coefficient $\beta_o<1.0$ means that the oxidizer, as supplied on entry to the cooling manifold two 13 from first partial oxidizer supply line 12, is not fully gasified (as fully gasified would have a gasification coefficient $\beta_o=1.0$). Note that as the oxidizer travels or flows within cooling manifold two 13, the oxidizer receives thermal energy (e.g. heat) from the adjacent LRE components (e.g. from one or more of turbine 20, gas duct 21, main combustion chamber 23) which heats the oxidizer and increases the oxidizer's gasification, meaning $\beta_o$ increases in value. Stated another way, as the oxidizer provided by first partial oxidizer supply line 12 flows through cooling manifold two 13, the oxidizer becomes gasified (wherein the gasified fuel is received at preburner injector head 17). Also, as the oxidizer travels or flows within cooling manifold two 13, the receipt of heat from adjacent LRE components serves to cool such components.

The second partial oxidizer supply line 16 supplies oxidizer to injector head 22 of the main combustion chamber 23. The oxidizer supplied by second partial oxidizer supply line 16 to injector head 22 has gasification $1-\beta_o$.

The third partial oxidizer supply line 14 supplies oxidizer to cooling manifold three 15. The cooling manifold three 15 operates with $\Delta P_{OL_{cool}}$.

Generally, various fluid supply lines (e.g. first partial oxidizer supply line 12 supplying oxidizer to cooling manifold two 13 and fuel line 3 supplying fuel to cooling manifold 11) are positioned so as to receive heat from LRE components, thereby providing a cooling to those components by receiving heat from those components. The received heat also serves to gasify the fluid operating within a particular oxidizer supply line. The terms "gasify," or "gasifying," and "gasification" mean to increase the percentage of gas relative to liquid in a fluid, i.e. to increase the value of $(1-\beta_o)$.

Gasified fuel or gasified oxidizer is produced by using respective liquid fuel or oxidizer for cooling. When a fuel or an oxidizer is fully gasified, its effective cooling ability has been consumed.

Cooling manifold one 11 (note $\Delta P_{FL_{cool}}$) is positioned adjacent nozzle 24 and receives fuel from fuel supply line 3. The supply line 3 provides or supplies fuel at a lower or distal position on the nozzle 24, meaning at a distal position of the LRE and at a distal position of the longitudinal axis 110. The received fuel from supply line 3 then travels upwards (or generally from a distal LRE location to a proximal LRE location) along or adjacent the nozzle 24, receiving thermal energy such as heat from the nozzle 24. The received heat serves to cool the nozzle 24 and also to gasify the fuel. Upon reaching the preburner injection head 17, after traveling the length of cooling manifold one 11, the fuel is, in one embodiment, fully gasified and thus has a gasification coefficient $\beta_f=1.0$ at exit. In one embodiment, the gasified fuel is then supplied to the preburner injector head 17. Upon reaching the upon reaching the preburner injection head 17, the fuel is substantially fully gasified, meaning the fuel has a gasification coefficient $\beta_f\sim1.0$ at exit.

The preburner injection head 17 mixes and blends gasified fuel received from the cooling manifold one 11 and gasified oxidizer received from cooling manifold two 13. Note that a set of preburner injection heads 17 are positioned at a lower or bottom or distal position of the cooling manifold two 13 and preburner combustion chamber 18 and may be axially symmetrically positioned about the LRE longitudinal centerline 110.

Adjacent to the mixing or combination of fluids at the preburner injection head 17 is preburner injector flow 171, where fluid flow moves between the cooling manifold two 13 and preburner combustion chamber 18.

The TPU shaft 1 is formed along and rotates about the LRE longitudinal centerline 110. Note $N_{FP}$ and $N_{OP}$ associated with the TPU shaft. The TPU shaft 1, driven by turbine 20, operates each of the fuel pump 2 and oxidizer pump 6 through supply of rotational energy or rotational power. The TPU shaft 1 is positioned in the proximal LRE portion 101 area.

The turbine 20 is positioned below or distal to the TPU shaft 1 and is driven by preburner exhaust products received from the preburner combustion chamber 18. The preburner exhaust products are guided or directed to the turbine 20 by way of a set of flow vanes 19. Note CT and $N_T$ associated with turbine 20. In one embodiment, the turbine 20 is a centrifugal turbine.

In other embodiments, the turbine 20 is any turbine known to those skilled in the art that may function in an LRE environment. Fluid leaving the turbine moves or travels downstream and is received by the gas duct 21. The turbine 20 is positioned and configured to be axially symmetric about the LRE longitudinal centerline 110.

Gas duct 21 (note $\Delta P_{GD}$) is fitted to receive fluid from the turbine 20 and pass the fluid through the main combustion chamber injector head 22 to the main combustion chamber 23. The fluid operating within gas duct is the preburner combustion (exhaust) products passed from or received from the preburner combustion chamber 18 by the turbine 20 and in turn passed to and received by the gas duct 21. The gas duct 21 may be configured with one or more flow straighteners (not shown) to reduce turbulence from the turbine 20. The gas duct 21 may generally be configured as a converging/diverging nozzle. The gas duct 21 is positioned and configured to be axially symmetric about the LRE longitudinal centerline 110. The gas duct 21 provides fluid to the main combustion chamber. The fluid passed or provided from the gas duct 21 to the main combustion chamber 22 is the preburner combustion (exhaust) products that was received by the turbine 20 from the preburner combustion chamber 18.

The main combustion chamber injector 22 receives fluid from the gas chamber 21. The main combustion chamber 23 may have a proximal portion of narrower diameter than the body of the main combustion chamber 23 to enable, among other things, fitting to the gas chamber. The main combustion chamber 23 has a main combustion chamber injector head 22 positioned at an upper or proximal position of the main combustion chamber 23. The main combustion chamber injector head 22 has a $\Delta P_{O\text{-}inj}$. The main chamber injector head 22 receives oxidizer from second partial oxidizer supply line 16 and combines the received oxidizer with the preburner combustion (exhaust) products received from the gas duct 21. Combustion of these fluids occurs in the combustion chamber 23, resulting in an LRE generated thrust directed downwards or distally through the nozzle 24.

The main combustion chamber 23 is positioned and configured to be axially symmetric about the LRE longitudinal centerline 110. The main combustion chamber injector head 22 may be positioned and configured to be axially symmetric about the LRE longitudinal centerline 110.

The nozzle 24 is a supersonic nozzle. The nozzle 24 is configured to receive the cooling manifold one 11 about the nozzle exterior and configured to receive the cooling manifold three 15 adjacent to and/or near a neck of the nozzle 24. Thermal energy, e.g. heat energy, is passed from the nozzle 24 to the cooling manifold one 11, wherein fuel supplied by fuel supply line 3 is gasified. The small portion of oxidizer contained in cooling manifold three 15 is injected into the lower portion of the combustion chamber 23 above and along the nozzle throat via transpiration, film, or other injection cooling method. The nozzle 24 is positioned and configured to be axially symmetric about the LRE longitudinal centerline 110.

Cooling manifold two 13 is positioned axially between the turbine 20, gas duct 21, and main combustion chamber 23. More specifically, the cooling manifold two 13 is positioned axially between the main combustion chamber outer wall 232 and the preburner inner wall 181. As provided above, the cooling manifold two 13 receives oxidizer fluid from the first partial oxidizer supply line 12, the fluid upon receipt by the cooling manifold two 13 not fully gasified. As the received fluid flows within cooling manifold two 13, the oxidizer fluid receives thermal energy (e.g. heat) from the adjacent LRE components (e.g. from one or more of turbine 20, gas duct 21, main combustion chamber 23) which heats the oxidizer and increases the oxidizer's gasification: the received oxidizer fluid becomes gasified during flow through the cooling manifold two 13. The gasified oxidizer fluid operating within the cooling manifold two 13 flows downward or distally within the LRE toward the preburner injector head 17 and the preburner injector flow 171. At the preburner injector flow 171, fluid flow from the cooling manifold two 13 moves to the preburner combustion chamber 18. The cooling manifold two 13 may be positioned and configured to be axially symmetric about the LRE longitudinal centerline 110.

The preburner combustion chamber 18 (note $\Delta P_{O \cdot gas_{gg}}$ and $\Delta P_{F \cdot gas_{gg}}$) is positioned axially distal to the cooling manifold two 13 and has preburner inner wall 181 and preburner outer wall 182. The preburner combustion chamber 18 forms an annular cavity.

The preburner combustion chamber 18 combusts oxidizer and fuel ignited by and at the preburner injector head 17, specifically gasified fuel received from the cooling manifold one 11 and gasified oxidizer received from cooling manifold two 13. The combustion of fluids by the preburner combustion chamber 18 produces preburner combustion exhaust products which are passed or provided to the turbine 20, resulting in rotational operation of the turbine 20. The preburner combustion chamber 18 is associated with $\Delta P_{O \cdot gas_{gg}}$ and $\Delta P_{F \cdot gas_{gg}}$. The preburner Combustion Chamber 18 may include a set of flow vanes 19 to align the combusted preburner exhaust flow into the turbine 20. The preburner Combustion Chamber 18 and/or flow vanes 19 may be positioned and configured to be axially symmetric about the LRE longitudinal centerline 110.

Cooling manifold three 15 may be configured with transpiration or film cooling holes, or another injection cooling mechanism, to cool the nozzle throat. The nozzle throat is typically the hottest area in an LRE and may require additional cooling to prevent overheating and damage to the nozzle. In one embodiment, the cooling manifold three 15 is configured to provide film or transpiration cooling of the nozzle throat 24.

Both the preburner injector 17 and the main injector 22 serve to separate propellants in many small feed lines which, during injection into the respective combustion chamber, induce mixing, dispersion, and (if any liquid is injected) atomization of the propellant for efficient and complete combustion. In the case of the preburner, "complete combustion" means only complete combustion of the oxidizer only with partial combustion of the fuel.

The performance of the LRE 100 of FIG. 1 may be determined by the nontrivial solution to the power balance equation $N_T = N_{\Sigma P_i}$ where $N_T$ is the power generated by the turbine 20, driven by the combustion in the preburner 18, and $N_{\Sigma P_i}$ is the power required by the turbine pumps 2 and 6 to overcome the sum of hydraulic losses throughout the propellant supply system, 3-5 and 7-9, which is dependent upon the selected pressure of the main combustion chamber 23. Here, $$N_T = \eta_t \dot{m}_{gg} R_{gg} T_{gg} \frac{k_{gg}}{k_{gg}-1} \left(1 - \left(\delta_g^{\frac{k_{gg}-1}{k_{gg}}}\right)^{-1}\right)$$

where $\eta_t$ is the turbine efficiency, $\dot{m}_{gg}$ is mass flow rate through the preburner, $k_{gg}$ is the adiabatic index of combustion, $R_{gg}$ is the gas constant, $T_{gg}$ is the combustion temperature, and $\delta_g$ is the pressure drop ratio in the preburner. The subscript gg stands for gas generator, referring to the preburner combustor. Also, $$N_{\Sigma P_i} = \frac{\dot{m}_f \eta_{cf}}{\eta_{fp} \rho_f} \left[\frac{\delta_g}{\eta_{gm_T}}(P_{ch} + \Delta P_{gd}) + \Delta P_{f,l} - P_{in.fp}\right] +$$

$$\frac{\dot{m}_o \eta_{co}}{\eta_{op} \rho_o} \left[\frac{\delta_g}{\eta_{gm_T}}(P_{ch} + \Delta P_{gd}) + \Delta P_{o,l} - P_{in.op}\right]$$

where each of the two large sets of brackets refers to the same parameters of the fuel feed system (subscript f, first brackets) and the oxidizer feed system (subscript o, second brackets). $\dot{m}_x$ is the total mass flow of a propellant, $\eta_{cx}$ is the pump loss coefficient, $\eta_{xp}$ is the pump efficiency, $\rho_x$ is the fluid density, $\eta_{gm_T}$ is the turbine loss coefficient, $P_{ch}$ is the main combustion chamber pressure, $\Delta P_{gd}$ is the pressure drop in the gas duct, $\Delta P_{x,l}$ is the total pressure loss across a propellant feed system, and $P_{in \cdot xp}$ is the pressure at the pump inlet. (note that x may be f if relative to fuel and may be o if relative to oxidizer.)

In the embodiment disclosed in FIG. 1, all fuel (methane) is combusted in the preburner with a part of oxidizer (oxygen), then recombusted with additional oxidizer in the main combustion chamber. This is called Fuel-Rich Staged Combustion.

An alternative embodiment of the LRE 100 routes all oxidizer through the preburner 18 with a part of fuel, followed by secondary combustion with additional fuel in the main combustion chamber 23. This alternative method is called an Oxidizer-Rich Staged Combustion and is more amenable to kerosene fuel. In this embodiment, nearly 100% of oxidizer is fed to cooling manifold one 11, instead of 100% of fuel, with a nearly negligible amount of oxidizer still being fed to cooling manifold three 15 for film or transpiration cooling. The fuel is instead fed in part to cooling manifold two 13 and in part directly to the main combustion chamber injector head 22 through a supply line equivalent to the main oxidizer supply line 16 in the fuel-rich version of the cycle.

FIG. 2 presents one method of regular or steady-state operation of the methane/oxygen LRE system of FIG. 1 (as opposed to transitional states, such as start-up). In one embodiment of a method of use, the LRE system 100 of FIG. 1 follows the sequence of steps described in FIG. 2. Other methods of use are possible, to include a sequence of steps different than those of FIG. 2, a sequence with additional steps, and a sequence with fewer steps. Also, as will be clear from the below description, elements of the LRE system 100 of FIG. 1, and/or other aspects of an LRE system as described in this disclosure, may be incorporated.

With particular attention to FIG. 2, a flowchart of a method of use of an LRE in steady-state operation is provided, the method 200 utilizing the elements described in the systems of FIG. 1.

The method 200 starts at step 204 and ends at step 236. Any of the steps, functions, and operations discussed herein can be performed continuously and automatically. In some embodiments, one or more of the steps of the method 200 may comprise computer control, use of computer processors, and/or some level of automation. For example, one or more components of the LRE 100, to include the entire LRE 100, may be controlled with aid of an engine control system. The steps are notionally followed in increasing numerical sequence, although, in some embodiments, some steps may be omitted, some steps added, and the steps may follow other than increasing numerical order.

At step 208, a liquid rocket engine (LRE) 100 of the type described with respect to FIG. 1 is provided. The LRE 100 is engaged with supplemental elements not explicitly described in FIG. 1, such as a fuel tank to provide fuel to fuel pump 2 and an oxidizer tank to supply oxidizer to oxidizer pump 6. After the completion of step 208, the method 200 continues to step 212.

At step 212, the oxidizer received at cooling manifold one 11 is gasified by way of traveling through or flowing through the cooling manifold one 11. After the completion of step 212, the method 200 continues to step 216.

At step 216, fuel received at cooling manifold two 13 is gasified by way of traveling through or flowing through the cooling manifold two 13. After the completion of step 216, the method 200 continues to step 220.

At step 220, the gasified oxidizer produced in step 212 is combined with the gasified fuel produced at step 216 is combusted within preburner combustion chamber 18 with aid of the preburner injector head 17, the combustion producing preburner combustion chamber exhaust products. The preburner combustion chamber exhaust products are directed, by way of a set of flow vanes 19, to the turbine 20. After the completion of step 220, the method 200 continues to step 224.

At step 224, the preburner combustion chamber exhaust are used to drive the turbine 20. The turbine drives the fuel pump 2 and the oxidizer pump in an in-line or linear configuration or arrangement. After the completion of step 224, the method 200 continues to step 228.

At step 228, the preburner combustion chamber exhaust products are passed to or flow to the gas duct 21 and then in turn to the main combustion chamber 23. The preburner combustion chamber exhaust products are combined or mixed with oxidizer provided by the second partial oxidizer supply line 16. The second partial oxidizer supply line 16 supplies oxidizer to the main combustion chamber injector head 22. After the completion of step 228, the method 200 continues to step 232.

At step 232, the preburner combustion chamber exhaust products are mixed and combusted with the oxidizer to produce thrust, the thrust directed through the nozzle 24 of the LRE 100. After the completion of step 232, the method 200 ends.

The benefits of the disclosed LRE are achieved by ensuring high reliability, compact design and efficiency of combustion with afterburning of the gas in a combustion chamber at a high level of pressures, which produces a high specific impulse. Experimentally confirmed theoretical calculations show that for combustion with oxygen, methane fuel exceeds the efficiency of kerosene in terms of specific impulse by around 20 s and is significantly better in cooling capacity. The temperature of combustion products in the combustion chamber is lower by 200 K at the optimum oxidizer ratio with methane fuel instead of kerosene fuel.

The advantages of the indicated fuel—methane (liquefied natural gas (LNG) of various compositions) enable effective and highly reliable LREs of a new concept: Fuel-Rich Staged Combustion. Typically, in a kerosene fuel engine, this is not possible due to heavy soot generation from the fuel-rich combustion. The rationale of this possibility is that oxygen-methane combustion with an excess of methane will generate minimal or no soot. In this case, the gas temperature before the turbine can be increased up to approximately 1300 K, which significantly improves the performance of fuel-rich oxygen-methane gas. If all other conditions are equal, this makes it possible to raise the pressure in the combustion chamber with an increase of the engine's specific impulse. At the same time, as it is known from the practice of development of LREs with afterburning of fuel-rich gas, such gas is not exposed to the danger of ignition in the turbine duct, which is much more likely for high-pressure oxidizing gas, increasing system safety over an oxidizer-rich embodiment. Thus, small damages of the fuel-rich gas duct will not lead to an accident or explosion. For a potential emergency situation, a special protection system can be envisaged in the LRE, which will promptly shutdown the faulty engine without damaging the test bench, launch complex, or payload.

An important circumstance in the peculiarities of working chemical processes of the disclosed oxygen-methane LRE is that it allows residual propellant to quickly evaporate from propellant lines after the engine's shutdown. At the same time, it is well known that kerosene must be removed from the supply line by force (by a special blowdown purge process), which requires special equipment and reserve of additional working fluids on board—this increases a mass of launch vehicle and decreases a mass of payload. These circumstances significantly reduce the cost of manufacturing an oxygen-methane LRE (estimated 30-40% manufacturing cost reduction versus an oxygen-kerosene). At the same time, the reliability of the engine increases, since after control and technological tests, there is no need to reassemble the hardware. Thus, it is easier and cheaper to reuse the conceptual oxygen-methane in general. Also, the limitations on multiple in-space starts of methane LRE are removed (which is peculiar to oxygen-kerosene). High reliability of oxygen-methane will ensure its long-lasting service life and launch vehicle in-flight safety, which will make it possible to reuse the engine and significantly reduce the cost of payload injection into the near and far space orbits.

It should be noted that oxygen-methane engines also operate with reduced environmental pollution relative to oxygen-kerosene LREs.

An embodiment with a multi-shaft TPU may be realized, however this would increase dry mass of the system.

The start-up of the LRE 100 may be described as follows. Like the method of FIG. 2, other methods of use are possible, to include a sequence of steps different than those described, a sequence with additional steps, and a sequence with fewer steps.

Start-up of the oxygen-methane LRE is initiated by a starting turbine installed at the TPU shaft with cartridge pressure accumulators, numbering equal to the number of the planned system starts.

The propellants are supplied from the propellant tanks (liquid methane and liquid oxygen) to the inlet devices of the pumps 2 and 6. Afterwards, propellants are supplied through the corresponding lines and control fittings to engine consumers 3-5 and 7-9. Through control throttle 10, a part of liquid oxygen that is gasified due to the cooling of gas duct 21 and cooling manifold 13 (cooling jacket of combustion chamber 23), is supplied into the annular fuel-rich preburner chamber 18. A small part of liquid oxygen is supplied to the nozzle throat area via cooling manifold three 15 where it is injected into the lower part main combustion chamber 22 for film and/or transpiration cooling of the nozzle throat. The residual part of liquid oxygen is supplied to the injector cavity of main chamber 16, and after spraying it is supplied to the head of combustion chamber 22 for mixing with the fuel-rich gas generated in the annular preburner integrated into the structure of combustion chamber 23 as a single structural unit, for complete combustion.

Liquid methane is supplied along the line with corresponding fittings to the nozzle cooling circuit 11 of the engine with the limited length acceptable for reliable cooling, where the fuel is heated up and completely gasified in the throat area. Afterwards the fuel (as the gasified methane) is supplied to the second part of this cooling manifold 11, the jacket of the annular fuel-rich preburner, providing cooling of the external wall of preburner.

Afterwards the mixing of gaseous methane from the cooling manifold 11 and a part of gaseous oxygen from the oxidizer cooling manifold 13 in the preburner combustion chamber with flow alignment vanes 12, generating a fuel-rich gas with the temperature=(890–1300) K, which is assigned depending on the required output power of TPU driving turbine.

At the preset temperature, the generated fuel-rich gas is supplied through the vanes to the blades of the centrifugal turbine 20, and afterwards through the gas duct 21 it is supplied to the combustion chamber 23 for complete combustion of propellant components, in such way forming the closed propellant supply system (CPSS).

High-temperature combustion products are expanded in the nozzle 24, generating the engine thrust. Control (thrust throttling) of the LRE is performed through the propellants bypass systems 4, 8 in response to the commands of the onboard automatic control system (ACS). Shutdown of the LRE is conducted by actuation of shut-off valves and provides multiple restarts of the engine with a preset number of starts (N) during one flight of launch vehicle.

With attention to FIG. 3, another embodiment of the Liquid Rocket Engine (LRE) 300 is depicted. The LRE 300 embodiment is generally similar to the LRE 100 embodiment with some additional and/or alternate features, as described below. The LRE 300 embodiment generally operates in a manner similar to that described in the method of regular or steady-state operation of the methane/oxygen LRE system of FIG. 2, with some additional and/or alternate steps as described below. The description of the LRE 300 embodiment of FIG. 3 is generally limited to the additional and/or alternate features of the LRE 300 embodiment relative to the LRE 100 embodiment of FIG. 1. In one embodiment, the LRE 300 of FIG. 3 is manufactured using 3-d printing techniques.

The LRE 300 comprises an upper or proximal LRE portion 301, a lower or distal portion 302, turbine 320, gas duct 321, and main combustion chamber 323. A longitudinal axis 310 passes through and extends pass the proximal LRE portion 301 and the distal portion 302. For example, the longitudinal axis 310 extends from distal LRE portion 302 through main combustion chamber 323, as depicted in FIG. 3. Like the LRE 100 embodiment, a series or sequence of components of the LRE 300 are assembled in a linear fashion along the longitudinal axis 310. For example, gas duct 321 is positioned at proximal LRE portion 301 and symmetrical about longitudinal axis 310.

Flow collimator 350 comprises a set of radial apertures 351 and a set of guide vanes 352. The flow collimator 350 is positioned longitudinally distal to the gas duct 321 and longitudinally proximal to the set of main combustion chamber injector heads 322. The set of radial apertures 351 of the flow collimator 350 are positioned longitudinally distal to the gas duct 321. The set of radial apertures 351 function to, among other things, to evenly distribute flow from the vanes to the injector heads. The structure of the flow collimator is supported by lattice structure 360. In the embodiment of the LRE 300 in which all or at least part of the LRE 300 is manufactured using 3-d printing techniques, the lattice structure 360 functions, among other things, to maintain the position of the flow collimator 350 during manufacture. The lattice structure 360 may also provide structural support to the guide vanes and/or the flow collimator 350. The lattice structure 360 may also function as guide vanes.

One or more supplemental fuel injection ports (aka supplemental fuel injection vanes) 370 are positioned radially distal to the main combustion chamber 323 and distal to the main combustion chamber combustion heads 322. The set of supplemental fuel injection ports 370 function, among other things, to provide "film cooling" near the injector face and/or nozzle throat. The phrase "film cooling" means the introduction of a secondary fluid (coolant or injected fluid) at one or more discrete locations along a surface exposed to a high temperature environment to protect that surface not only in the immediate region of injection, but also in the downstream region.

One or more pre-burner oxidizer manifolds 340 are positioned radially distal to an upper portion of the gas duct 321. The one or more pre-burner oxidizer manifolds 340 function to, among other things, deliver oxidizer to the gas duct 321 and/or provide cooling to the gas duct 321.

Shared coolant manifold 313 is positioned radially distal to main combustion chamber 323 and functions, among other things and in one embodiment, similar to the cooling manifold two 13 of LRE 100.

In one embodiment, the turbine comprises a set of channeled turbine stator blades providing cooling to the turbine and routing of fuel to the main combustion chamber injector head.

In one embodiment, propellants used may include liquid oxygen and RP-1 (Rocket Propellant-1) kerosene.

In one embodiment, one or more components of the system re fabricated by way of 3-d printing.

In one embodiment, the LRE may operate with any fuel, to include without limitation methane and kerosene, known to those skilled in the art.

The above embodiments may, in combination or separately, may utilize computer software and/or computer hardware (to include, for example, computer-readable mediums) for any of several functions such as automated control and state estimation, and furthermore may utilize one or more GUIs for human interaction with modules or elements or components.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The exemplary systems and methods of this disclosure have been described in relation to a liquid rocket engine. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A liquid rocket engine (LRE) comprising:
a fuel supply line containing a fuel;
an oxidizer supply line containing an oxidizer, the oxidizer supply line splitting into a plurality of partial oxidizer supply lines;
a turbine mounted to a turbine shaft along a longitudinal centerline of the LRE and rotating with the turbine shaft about the longitudinal centerline;
a main combustion chamber having a main combustion chamber injector head in fluid communication with the turbine and in fluid communication with at least one of the plurality of partial oxidizer supply lines;
a flow collimator comprising a set of apertures;
a nozzle in fluid communication with the main combustion chamber; and
a preburner combustion chamber having a preburner injector head;
wherein:
the preburner injector head injects the fuel with the oxidizer to create preburner combustion exhaust products which drive the turbine about the turbine shaft, the preburner combustion exhaust products flowing from the turbine to the main combustion chamber via a gas duct;
the flow collimator is in fluid communication with the gas duct and the main combustion chamber; and
the main combustion chamber injector head injects the preburner combustion exhaust products received from the turbine with the oxidizer to produce an LRE thrust.

2. The liquid rocket engine of claim 1, wherein the gas duct is positioned axially between the turbine and the main combustion chamber.

3. The liquid rocket engine of claim 1, wherein at least some of the oxidizer becomes a gasified oxidizer due to thermal energy transfer from at least one of the gas duct, the main combustion chamber, and the preburner combustion chamber.

4. The liquid rocket engine of claim 1, wherein at least some of the fuel becomes a gasified fuel due to thermal energy transfer from the nozzle to the at least some of the fuel, the gasified fuel supplied to the preburner injector head.

5. The liquid rocket engine of claim 1, wherein the flow collimator is positioned longitudinally proximal to the main combustion chamber injector head and positioned longitudinally distal to the gas duct.

6. The liquid rocket engine of claim 5, further comprising a lattice structure positioned proximal to the main combustion chamber injector head.

7. The liquid rocket engine of claim 1, further comprising a set of supplemental fuel injection ports positioned distal to the main combustion chamber infector head.

8. The liquid rocket engine of claim 1, wherein:
the turbine is a centrifugal turbine;
the preburner combustion chamber forms an annulus around the main combustion chamber; and
the fuel is methane.

9. A method of operating a liquid rocket engine (LRE) comprising:
providing a LRE comprising:
a fuel supply line containing a fuel;
an oxidizer supply line containing an oxidizer;
an oxidizer throttle;
a turbine mounted to a turbine shaft along a longitudinal centerline of the LRE;
a main combustion chamber having a main combustion chamber injector head in fluid communication with each of the turbine and at least one of the plurality of partial oxidizer supply lines;
a gas duct;
a flow collimator comprising a set of apertures, the flow collimator in fluid communication with the gas duct and with the main combustion chamber;
a nozzle in fluid communication with the main combustion chamber; and
a preburner combustion chamber having a preburner injector head;
receiving the oxidizer from the oxidizer supply line;
splitting the oxidizer supply line into a plurality of partial oxidizer supply lines;
injecting, using the preburner injector head, the fuel with the oxidizer to create preburner combustion exhaust;
rotating the turbine about the turbine shaft;
flowing, via the gas duct, the preburner combustion exhaust products from the turbine to the main combustion chamber; and
injecting, using the main combustion chamber injector head, the preburner combustion exhaust products received from the turbine with oxidizer to produce an LRE thrust.

10. The method of claim 9, wherein:
the gas duct is positioned axially between the turbine and the main combustion chamber; and
at least some of the oxidizer becomes a gasified oxidizer due to thermal energy transfer from at least one of the gas duct, the main combustion chamber, and the preburner combustion chamber.

11. The method of claim 9, wherein at least some of the fuel becomes a gasified fuel due to thermal energy transfer from the nozzle to the at least some of the fuel, the gasified fuel supplied to the preburner injector head.

12. The method of claim 9, wherein the flow collimator is positioned longitudinally proximal to the main combustion chamber injector head and positioned longitudinally distal to the gas duct.

13. The method of claim 12, the LRE further comprising a lattice structure positioned proximal to the main combustion chamber injector head.

14. The method of claim 9, the LRE further comprising a set of supplemental fuel injection ports positioned distal to the main combustion chamber injector head.

15. The method of claim 9, wherein:
the turbine of the LRE is a centrifugal turbine;
the preburner combustion chamber forms an annulus around the main combustion chamber; and
the fuel is methane.

16. A rocket engine comprising:
a fuel supply line configured to supply a fuel;
an oxidizer supply line configured to supply an oxidizer, the oxidizer supply line comprising a set of partial oxidizer supply lines;
a turbine mounted to a turbine shaft along a longitudinal centerline of the rocket engine, the turbine configured to rotate with the turbine shaft about the longitudinal centerline;
a main combustion chamber comprising a main combustion chamber injector head, the main combustion chamber in fluid communication with the turbine and in fluid communication with at least one of the set of partial oxidizer supply lines;
a flow collimator positioned longitudinally proximal to the main combustion chamber injector head, the flow collimator comprising a set of apertures positioned longitudinally distal to the gas duct, the flow collimator in fluid communication with a gas duct and with the main combustion chamber; and
a preburner combustion chamber comprising a preburner injector head;
wherein:
the preburner injector head injects the fuel with the oxidizer to create preburner combustion exhaust products which drive the turbine about the turbine shaft; and
the main combustion chamber injector head injects the preburner combustion exhaust products received from the turbine with the oxidizer to produce a rocket engine thrust.

17. The rocket engine of claim 16, wherein at least some of the oxidizer becomes a gasified oxidizer due to thermal energy transfer from at least one of the gas duct, the main combustion chamber, and the preburner combustion chamber.

18. The rocket engine of claim 16, wherein at least some of the fuel becomes a gasified fuel due to thermal energy transfer from the nozzle to the at least some of the fuel, the gasified fuel supplied to the preburner injector head.

19. The rocket engine of claim 16, further comprising:
a lattice structure positioned proximal to the main combustion chamber injector head;
a nozzle in fluid communication with the main combustion chamber; and
a set of supplemental fuel injection ports positioned distal to the main combustion chamber injector head.

20. The rocket engine of claim 16, wherein the preburner combustion chamber forms an annulus around the main combustion chamber.

* * * * *